United States Patent Office 2,718,455
Patented Sept. 20, 1955

2,718,455

PROCESS FOR PRODUCING BASIC IRON SULFATE

Walter R. McCormick, Jr., Plainfield, N. J., assignor to National Lead Company, New York, N. Y., a corporation of New Jersey No Drawing. Application August 11, 1950,
Serial No. 178,985

4 Claims. (Cl. 23—126)

This invention relates to the separation of iron in processes for the treatment of ores or concentrates containing iron and other valuable metallic constituents.

The type of ores and ore concentrates useful in the practice of this invention contain, in addition to iron compounds of more valuable metals as for instance, copper, nickel and cobalt. These metals, as well as the iron content may be present in the form of sulphides. Suitable methods for recovery of these valuable constituents from the ore generally involve dissolving the ore and separating the various components by the formation of insoluble compounds. In these processes, the iron is generally converted into a soluble sulphate and other constituents are precipitated as insoluble compounds leaving a stripped iron sulphate solution. Such processes, however, are generally not efficient and the continuing presence of iron in solution during the successive steps necessary for recovery of other metals has inevitably caused processing difficulties and contamination of products.

It is therefore the object of this invention to provide a method for treatment of iron containing ores or concentrates in which the iron is removed as an insoluble compound providing a substantially iron free solution from which other metallic values may be separated or precipitated. A further object of this invention is to provide a method for removing soluble iron sulphate compounds from a solution containing the same. These and other objects of the invention will be apparent from the following detailed description thereof.

This invention in its broadest aspects contemplates the removal of iron from iron-bearing materials such as ore and concentrates by treating said materials to form a sulphuric acid solution thereof which contains between 15 and 250 grams per liter free sulphuric acid. The sulphuric acid solution is heated at temperatures between 400 and 500° F. in a suitable container at a pressure greater than 400 pounds per square inch in the presence of an oxidizing gas such as air or oxygen. During the high pressure-high temperature oxidation treatment, the iron sulphate compounds in the solution are converted to insoluble basic iron sulphate compounds which are subsequently removed from the supernatant solution by filtering or other suitable methods. In a more restricted embodiment, this invention contemplates the treatment of iron bearing sulphide concentrates or ores by treating these at elevated temperature and pressure in the presence of an oxidizing gas to convert the metallic constituents in the ore or concentrates to sulphates. Simultaneously the so-formed iron sulphate is converted to an insoluble basic iron sulphate which may subsequently be removed from the solution by filtration thus providing a solution of the other metallic values purified with respect to iron content. It is preferred when operating according to this procedure to further treat the solution in a second step by partially neutralizing to reduce the free sulphuric acid content to between 15 and 50 grams per liter and to follow this by an additional high temperature-high pressure oxidation step to remove additional iron sulphate content. While the iron removal in the first step as described will reduce the iron content to between 10 and 20% of the original Fe content, the second treatment step as described may reduce the iron content to less than 1% of the original. Such a solution is admirably suited for further treatment for the recovery of other valuable metallic constituents which may be present in the original ore.

More specifically, the invention may be practiced by treating sulphide ores for example one containing iron, nickel, copper, lead, cobalt and sulphur. The concentrate is admixed with water and the mixture treated at a temperature between 400 and 500° F. in a suitable container such as an autoclave at a pressure of at least 400 pounds per square inch preferably 400–600 pounds in the presence of an oxidizing gas such as oxygen for a period of from 1 to 3 hours. The amount of water added will depend on the nature of the ore and its contents of metals and sulphur and the proportion of iron present. The water may be added in amount to provide the desired free acid concentration in the sulphate solution formed, the amount being calculated on the basis of the total sulphur present and the proportionate content of iron and other metals. The sulphur will be converted to sulphate ions and the excess over that required to form sulphates of the metals present including basic iron sulphate, will be present as free acid. Free acid contents ranging from 15 to 250 grams per liter of $H_2SO_4$ will generally be obtained when sulphide ores in the form of concentrates are mixed with water to form slurries having from 10% to 40% solids content.

Under these conditions, the iron sulphide content of the ore is converted to iron sulphate which is then precipitated as basic iron sulphate while other metallic values such as cobalt, nickel and copper in the ore are converted to soluble sulphates. Lead present will be converted to insoluble lead sulphate. After treatment at high-pressure and high-temperature, the mixture is filtered to remove the insoluble material present which will include the basic iron sulphate, and a solution is obtained containing soluble sulphates of cobalt, nickel and copper. Due to the proportions of sulphur present in the type of ore described, the sulphuric acid concentration at this stage in the solution will generally be of the order of 100 to 250 grams per liter, $H_2SO_4$ and the iron content may be of the order of less than 5%.

In order to further reduce the iron content, the clarified solution is partially neutralized, for example by the addition of lime, until the free sulphric acid content is between 15 and 50 grams per liter. The partially neutralized solution is again heated at a temperature between 400 and 500° F. at a pressure of more than 400 pounds per square inch in the presence of an oxidizing gas such as oxygen. As a result of this further treatment, additional basic iron sulphate is precipitated from the solution and may be separated therefrom by any convenient method for instance filtration. The substantially iron free solution may then be processed for the recovery of cobalt, nickel, copper and other metallic constituents present.

It has been found in the practice of this invention that the efficiency of separation of basic iron sulphate from sulphuric acid solutions containing iron and other sulphate compounds depends to a large extent on the amount of free sulphuric acid present in such solutions. Efficient separation of basic iron sulphate may be obtained when the free sulphuric acid content is within the broad range of 15 to 250 grams per liter, $H_2SO_4$. Another factor apparently effecting the removal or precipitation of basic iron sulphate is the presence of insoluble material in the solution. In the case of the embodiment described above, wherein the iron is separated into two steps, it is essential that the solution first formed is filtered to remove already precipitated basic iron sulphate before the second high temperature oxidation step is accomplished. Apparently the presence of insoluble material and particularly already precipitated basic iron sulphate inhibits the precipitation of additional amounts of this compound and even prolonged heating under pressure will not result in as efficient iron removal as intermediate filtering followed by an additional high temperature oxidation step.

Best operating conditions include an operating temperature of between 400 and 500° F. and preferably between 420 and 460. Pressure conditions should be maintained at above 400 pounds per square inch and for convenience and economy it is preferred to maintain the pressure between 400 and 600 pounds per square inch. The oxidizing gas employed may conveniently be air or oxygen. When air is employed as the oxidizing gas, higher pressures may be employed than when oxygen is used. Air at a pressure of about 1000 pounds per square inch has been found to provide adequate oxidizing effect to produce the reaction desired in a reasonable time. Higher pressures may be employed if desired but such involve problems of materials and construction of the apparatus used. In addition it is generally desirable to maintain the pressure during the oxidation somewhat above the corresponding pressure of steam at the temperature employed. This "over pressure" is obtained by introducing the oxidizing gas at the desired pressure into the autoclave or apparatus employed. During the high temperature oxidation treatment the reaction mass should be agitated in order to obtain best reaction efficiency. To accomplish this a suitable agitator should be used in conjunction with the autoclave or other high pressure apparatus employed.

While the restricted embodiment described generally above contemplates the direct solution of iron sulphide concentrate, this invention is not intended to be limited to treatment only of this raw material. Due to the sulphide nature of this concentrate, the proportion of sulphur present in reaction of the iron is such that a direct oxidation solution step will produce a sulphuric acid solution of the concentrate in which the free sulphuric acid will be about 100 to 250 grams per liter. Under conditions when such favorable proportions of sulphur and iron are not found in the raw material taken, suitable adjustments in the amounts of iron or sulphuric acid taken should be made so as to form a sulphate solution containing free sulphuric acid within the described limits.

In order to show the effect of the free sulphuric acid concentration on the efficiency of removal of basic iron sulphate, the following table shows the percentage removal of iron obtained by the process of this invention under various free acid conditions.

TABLE I

| Grams per liter Free $H_2SO_4$ in Ferrous Sulphate Solution | Percent Removal of Iron as Basic Iron Sulphates |
| --- | --- |
| 15 g. per liter | 98 |
| 35 g. per liter | 87 |
| 50 g. per liter | 86 |
| 150 g. per liter | 84 |
| 250 g. per liter | 80 |

Further purification of the iron sulphate solution described as the second step above is effective in producing a solution which may contain the other valuable metal present in the ore in solution as sulphates. While reduction of the sulphuric acid content of the solution promotes more efficient separation of the iron by precipitation as basic iron sulphate, if the free acid content is too low the solubility of the other valuable metallic sulphates may be affected. However, it is preferred that when operating the process of the present invention on concentrates of the type described to maintain a free acid content in the second treatment step not lower than 15 grams per liter to provide proper iron removal and at the same time, maintain the copper, nickel and cobalt in solution as soluble sulphates. In order to demonstrate the practice of this invention as specifically applied to the treatment of iron bearing sulphide ores, the following Example I shows treatment of such an ore by a 2-step process as described generally above:

*Example I*

A charge of 100 pounds of sulphide ore concentrate having the following sulphur and metal contents:

| | Per cent |
| --- | --- |
| Iron | 36.05 |
| Sulphur | 43.17 |
| Lead | 1.30 |
| Copper | 2.45 |
| Nickel | 4.00 |
| Cobalt | 3.01 | was mixed with sufficent water to form a slurry having 30% solids. The ore concentrate was of a fineness of about 55% minus 325 mesh. The slurry was charged into an autoclave equipped with an agitator and oxygen was supplied to the charge in the autoclave. The temperature of the charge was maintained for two hours at 450° F. and the pressure inside the autoclave was maintained at 600 pounds per square inch. The charge was continuously agitated during this time of treatment. After treatment in the autoclave, the charge was removed and the solution was found to contain the copper, nickel and cobalt values in solution as soluble sulphates and a large proportion of the iron was in the form of precipitated basic iron sulphate. The free sulphuric acid concentration of the solution was found to be 150 grams per liter. This proportion of free sulphuric acid was formed as a result of excess sulphur in the charge over that required to form sulphates of the metal content of the ore.

The basic iron sulphate was separated from the solution by filtration and was found to contain 30.2 pounds of iron (Fe). This amounted to a separation of 84% of the original iron content of the material charged to the autoclave. The separated precipitate contained minor amounts of cobalt, nickel and copper sulphate apparently occluded salts as well as substantially all the lead in the original ore which had been precipitated as a sulphate.

Following separation of the precipitate, the solution was neutralized by addition of lime in amount so that the original free sulphuric acid concentration was reduced to 20 grams per liter. Following neutralization, the solution was again subjected to treatment in the autoclave in the presence of oxygen and agitation at a temperature of 450° F. and a pressure of 600 pounds per square inch for a period of 2 hours. This second high temperature treatment resulted in the precipitation of additional basic iron sulphate which after reaction in the autoclave was separated from the solution by filtration. The precipitate was found to contain 5.5 pounds of iron as basic iron sulphate which when added to the precipitate separated after the original heat treatment step amounted to about 99% of the total iron originally present in the concentrate. The precipitate separated after the second high temperature treatment also contained small amounts of occluded cobalt, nickel and copper salts. The residual solution containing about 1% of the original iron in the ore contained substantially all of the cobalt, nickel and copper as soluble sulphates. This solution was then treated by high pressure reduction with hydrogen to precipitate metallic copper and then to a crystallization step to separate mixed nickel and cobalt sulphate crystals. The elimination of substantially all the iron content as basic iron sulphate resulted in efficient precipitation of the copper and also clean separation of the cobalt and nickel values from the solution.

This invention provides a simple economical method for the separation of iron from solutions containing iron sulphate. The precipitation of iron as basic sulphate is efficient and the proportion of iron removed may be controlled by controlling the free sulphuric acid content of the solution. In the case of the treatment of iron bearing sulphide ores, the process of this invention provides efficient and economical iron separation producing a substantially iron free solution admirably adapted for recovery of other metal values.

It is somewhat surprising that a basic iron sulphate can be precipitated from an acid iron sulphate solution. This does occur however under the conditions specified and makes possible the separations referred to. The exact nature of the iron salt precipitated is not precisely known. However, analysis has shown that it is of variable composition containing combined ferric hydroxide and sulphate in which the molar ratio of iron to sulphur may vary between about 0.5 and 2 moles of iron to 1 mole of sulphur, and will most generally be found to contain about 1 mole of Fe per mole of S. The basic iron sulphate produced in Example I was carefully analyzed and found to correspond most nearly to the formula $$Fe_4(OH)_2(SO_4)_5$$

While this invention has been described and illustrated by the embodiments shown, it is not intended to be strictly limited thereto and other modifications and variations may be employed within the scope of the following claims.

I claim:

1. In a process for the treatment of metallic sulphide ore concentrate containing a preponderance of iron sulphide together with metallic values of the group consisting of copper, nickel and cobalt, the steps which comprise admixing the concentrate with sufficient water to form a slurry containing from 10% to 40% solids, heating the slurry with agitation at a temperature of between 400° F. and 500° F. at a pressure of more than 400 pounds per square inch in the presence of an oxygen-containing gas for a period of from 1 to 3 hours to oxidize metallic sulphides in said slurry to sulphates and simultaneously to form therefrom a precipitate of basic iron sulphate containing a major portion of the iron content of said slurry and a solution of sulphates of said metallic values, and separating said precipitate of basic iron sulphate from said solution.

2. In a process for the treatment of metallic sulphide ore concentrate containing a preponderance of iron sulphide together with metallic values of the group consisting of copper, nickel and cobalt, the steps which comprise admixing the concentrate with sufficient water to form 10% to 40% solids, heating the slurry with agitation at a temperature of between 400° F. and 500° F. at a pressure of from 400 to 1600 pounds per square inch in the presence of an oxygen-containing gas for a period of from 1 to 3 hours to oxidize metallic sulphides in said slurry to sulphates and simultaneously to form therefrom a precipitate of basic iron sulphate containing a major portion of the iron content of said slurry and a solution of sulphates of said metallic values, and separating said precipitate of basic iron sulphate from said solution.

3. In a process for the treatment of metallic sulphide ore concentrate containing a preponderance of iron sulphide together with metallic values of the group consisting of copper, nickel and cobalt, the steps which comprise admixing the concentrate with sufficient water to form a slurry containing from 10% to 40% solids, heating the slurry with agitation at a temperature of between 420° F. and 460° F. at a pressure of more than 400 pounds per square inch in the presence of an oxygen-containing gas for a period of from 1 to 3 hours to oxidize metallic sulphides in said slurry to sulphates and simultaneously to form therefrom a precipitate of basic iron sulphate containing a major portion of the iron content of said slurry and a solution of sulphates of said metallic values, and separating said precipitate of basic sulphate from said solution.

4. In a process for the treatment of metallic sulphide ore concentrate containing a preponderance of iron sulphide together with metallic values of the group consisting of copper, nickel and cobalt, the steps which comprise admixing the concentrate with sufficient water to form a slurry containing from 10% to 40% solids, heating the slurry with agitation at a temperature of between 400° F. and 500° F. at a pressure of more than 400 pounds per square inch in the presence of an oxygen-containing gas for a period of from 1 to 3 hours to oxidize metallic sulphides in said slurry to sulphates and simultaneously to form therefrom a precipitate of basic iron sulphate containing a major portion of the iron content of said slurry and a solution of sulphates of said metallic values, separating said precipitate of basic iron sulphate from said solution, adjusting the acidity of said solution to between 15 and 50 grams per liter of free sulphuric acid, heating said solution at a temperature of from 400° F. to 500° F. at a pressure of over 400 pounds per square inch in the presence of an oxygen-containing gas for a period of from 1 to 3 hours to precipitate additional basic iron sulphate from the solution and separating the precipitated basic iron sulphate from the solution.

References Cited in the file of this patent

UNITED STATES PATENTS

| Number | Name | Date |
| --- | --- | --- |
| 981,451 | McKechnie et al. | Jan. 10, 1911 |
| 1,047,826 | McKechnie et al. | Dec. 17, 1912 |
| 1,146,071 | Hoffman | July 13, 1915 |
| 1,384,974 | Shaw | July 19, 1921 |
| 1,503,229 | Clark | July 29, 1924 |
| 1,649,152 | Clark | Nov. 15, 1927 |
| 2,296,423 | Clark | Sept. 22, 1942 |